United States Patent [19]

Nakamura et al.

[11] 4,353,479

[45] Oct. 12, 1982

[54] MASTER CYLINDER RESERVOIR AND COVER FASTENING MEANS

[75] Inventors: Kaoru Nakamura, Anjo; Akira Funabashi, Toyota, both of Japan

[73] Assignee: Aisin Seiki Kabushiki Kaisha, Kariya, Japan

[21] Appl. No.: 270,000

[22] Filed: Jun. 3, 1981

[30] Foreign Application Priority Data

Jun. 12, 1980 [JP] Japan .................. 55-81044[U]

[51] Int. Cl.³ .................. B65D 41/06; B65D 41/36
[52] U.S. Cl. .................. 220/301; 220/295; 220/302; 220/293
[58] Field of Search ............ 220/293, 301, 302, 295

[56] References Cited

U.S. PATENT DOCUMENTS 3,317,079  5/1967  Ferrell et al. .................. 220/301
3,888,383  6/1975  Rowlands .................. 220/293

Primary Examiner—George T. Hall
Attorney, Agent, or Firm—Oblon, Fisher, Spivak, McClelland & Maier

[57] ABSTRACT

A master cylinder reservoir includes a reservoir cap fixed in an open portion of the reservoir. The master cylinder reservoir comprises a cam portion formed on the periphery of the reservoir in the direction meeting at right angles with the axial center of the reservoir, a nail means formed on the reservoir cap and having tip end bended inside, a guide means formed on the upper end of the cam portion, and a gloove-hole formed between the cam means, and the stop means to thereby receive the tip end of the nail means therein, whereby the movement of the reservoir cap in the circumferential direction and the upper and lower directions will be prevented.

5 Claims, 4 Drawing Figures

MASTER CYLINDER RESERVOIR AND COVER FASTENING MEANS

BACKGROUND OF THE INVENTION

1. Field of the Invention

This invention relates to a master cylinder reservoir in general, and more particularly to a master cylinder reservoir which characterizes a reservoir cap holding mechanism.

2. Description of the Prior Art

Conventionally, two mechanisms have been known as reservoir cap holding mechanism. That is to say, one is a snap fitting mechanism and the other is a mechanism which can prevent the movement of the cap nail into axial direction thereof. However, though the former mechanism can hold the reservoir cap by the elastic deformation of the fringe portion of the reservoir cap, in this mechanism it is difficult to prevent the reservoir cap from moving in the circumferential direction owing to the turning of the reservoir cap. Furthermore, the reservoir cap may be greatly loose or shaky into the upper and lower directions thereof. In the latter mechanism, since the stress which is exerted on the end of the cap nail will be great, the fatigue destruction will be apt to occur thereabout.

SUMMARY OF THE INVENTION

An object of the present invention is, therefore, to provide a new and improved master cylinder reservoir which obviates the disadvantages of prior master cylinder reservoirs.

More particularly it is an object of the present invention to provide a new and improved master cylinder reservoir wherein the nail portion formed on the reservoir cap engages with the cam portion and the groove hole which are formed on the outer periphery of the reservoir.

Another object of the present invention is to provide a new and improved master cylinder reservoir which can reduce the fatigue destruction and prevent the reservoir cap from being loose or shaky in the circumferential direction and the upper and lower directions.

Still another object of the present invention is to provide a new and improved master cylinder reservoir which is simple in construction, economical to manufacture and thoroughly reliable in operation.

BRIEF DESCRIPTION OF THE DRAWINGS

Other objects, features and advantages of the invention will become more apparent upon reference to the succeeding detailed description thereof, and to the drawings wherein.

DETAILED DESCRIPTION OF THE PREFERRED EMBODIMENT

Figure 1:
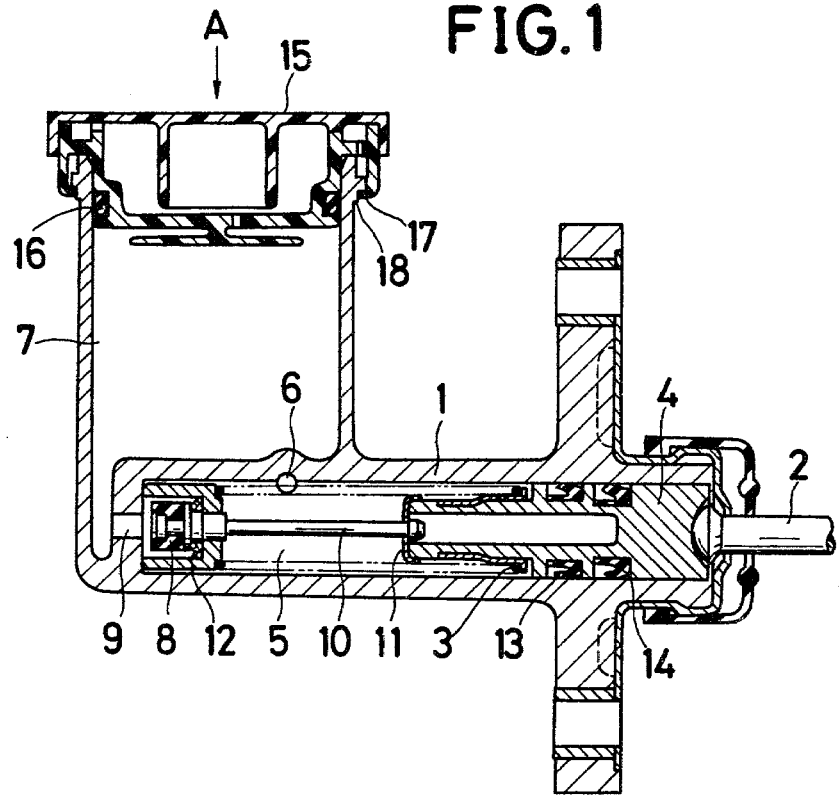
FIG. 1 is a side sectional view of a master cylinder reservoir in accordance with one illustrative embodiment of the present invention.
Figure 2:
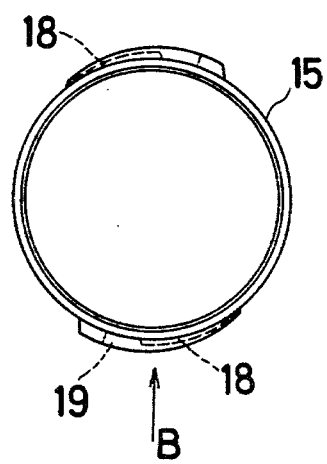
FIG. 2 is a plan view from an arrow A in FIG. 1 but a cap being removed.

Referring now to FIG. 1, a master cylinder 1 includes a piston 4 which can shift against the force of the spring 3 by the pressure of the push rod 2. When the oil pressure in a pressure chamber 5 increases by the shift of the piston 4, the pressurized oil in the pressure chamber 5 is supplied through a hole 6 to a wheel cylinder or a clutch release cylinder (not shown).

In the other side wall of the master cylinder 1, there is provided a hole 9 through which the pressure chamber 5 is in communication with a reservoir 7 through means of a valve means 8. Fixed on the valve means 8 is a rod 10 which is prevented from moving to the left by means of a stopper member 11. When the stopper member 11 moves to the left with the piston 4, the rod 10 may be movable. Therefore, the valve means 8 moves to the left by the biasing force of the spring 12 and is urged into the position in which the hole is closed. As a result, the oil pressure in the pressure chamber is increased in response to the left movement of the piston 4. Seal means 13 and 14 are disposed on the periphery of the piston 4.

Figure 3:
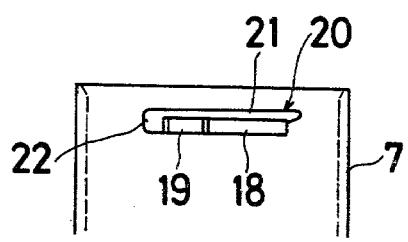
FIG. 3 is a fragmentary front view from an arrow B in FIG. 2.
Figure 4:
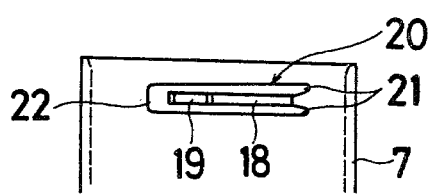
FIG. 4 is a view similar to FIG. 3, but showing another embodiment of the present invention.

A reservoir cap 15, being made of synthetic resin, includes a seal member 16 which fits on the surface of the inner circumference of the reservoir 7. The reservoir cap 15 includes a nail means 17 which comprises plural nails (two nails are shown in the drawing) whose tip ends bend inside. The nail means 17 engages rotatably with the reservoir 7. Formed on the outer periphery of the reservoir 7 in the direction meeting a right angles with the axial center of the reservoir 7 is a cam means 18 which comprises as many cam portions as the nails of the nail means 17. Many cam means 18 may be disposed at the same intervals on the outer periphery of the reservoir 7. The cam means 18 is of circular arc configuration so as to gradually increase its radius, and the height of the cam means 18 defined by the minimum radius thereof will correspond to the vertical position of the nail means 17 under the condition that the reservoir cap 15 is put on the reservoir 17. A groove-hole 19 is formed between the end portion of the cam means defined by the maximum radius thereof and a stop means 22 formed on the reservoir 7. The stop means 22 may be preferably formed on a guide means. The bended tip end of the nail 17 may fall in the groove-hole 19 when the reservoir cap 15 is turned whereby the movement of the nail 17 is prevented. The guide means 20 of convex shape is formed on the upper end of the cam means 18 wherein the lower end of the guide means 20 may be formed so as to agree almost with the upper end of the cam means 18, as shown in FIG. 3. In this case, the measure tolerance is fixed that there may be no gap or slightly gap between the tip end of the nail means 17 and the guide means 20 to thereby prevent downward deformation of the tip end of the nail means 17. The guide means 20 guides the nail means 17 to thereby prevent the reservoir cap 15 from coming off upwardly. The FIG. 3 shows that the guide means 20 consists of a guide portion 21 of one line. However, the guide means may have two guide portions 21 as shown in FIG. 4. In FIG. 4, two guide portions 21 are formed on both of upper and lower ends of cam means 18, respectively. In this case, the reservoir cap 15 can be prevented from moving both upwardly and downwardly.

In operation, as shown in FIG. 1, the reservoir cap 15 is put on the reservoir 7 so as to cause the nail 17 to position on the minimum raidus of the cam means 18. When the reservoir cap 15 is then turned into a direction wherein the nail 17 may engage with the maximum radius portion of the cam means 18, the tip of the nail 17 will ries on the cam means 18 having the increasing radius. Thus, the nail 17 will displace in the outer direction while the nail 17 may be prevented from moving upwardly by means of the guide portion 21. When the bended tip of the nail 17 passes through the maximum radius portion of the cam means 18, the bended tip of the nail 17 falls in the groove hole 19 to thereby completely prevent the movement of the reservoir cap 15 in the circumferential direction and the upper and lower directions.

In case of detaching the reservoir cap 15, the engagement of the nail 17 with the cam means 18 and the guide portion 21 can be released by turning the reservoir cap 15 in the reverse direction, and then the reservoir cap 15 can be detached from the reservoir 7.

As it is previously explained, since the nail 17 formed on the reservoir cap 15 is displaced only in its radius direction, no fatigue destruction will be occurred. Furthermore, since the nail 17 engages with the guide portion 21 and the groove-hole 19, the reservoir cap 15 can be prevented from moving in the circumferential direction and in the upper direction, thereby preventing the reservoir cap 15 from being loose.

What is claimed is:

1. A master cylinder reservoir including a reservoir cap fixed in an open portion of said reservoir, said reservoir comprising:

a cam means formed on the periphery of said reservoir in the direction meeting at right angles with the axial center of said reservoir, said cam means being of a circular arc configuration so as to gradually increase its radius;

a nail means formed on said reservoir cap and having tip end bended inside, said nail means being displaced outwardly during engaging with said cam means;

a guide means formed on the upper end of said cam means wherein the lower end of said guide means may be formed so as to agree with at least the upper end of said cam means;

a gloove-hole means formed between the end portion of said cam means defined by the maximum radius portion of said cam means and a stop means formed on said reservoir.

2. A master cylinder reservoir according to claim 1 wherein said nail means comprises plural nails and wherein said cam means comprises as many cam portions as the nails of said nail means.

3. A master cylinder reservoir according to claim 1 wherein said cam means has the height which is defined by the minimum radius thereof and corresponds to the vertical position of said nail means.

4. A master cylinder reservoir according to claim 1 wherein said guide means is of a convex configuration.

5. A master cylinder reservoir according to claim 1 wherein said guide means comprises two guide portions formed on the upper and lower ends of said cam means.

* * * * *